United States Patent [19]

Freeman et al.

[11] Patent Number: 5,571,317
[45] Date of Patent: Nov. 5, 1996

[54] FIBER-REINFORCED MAGNESIUM OXYCHLORIDE BOND

[75] Inventors: Stephen M. Freeman, Roscoe, Ill.; David B Hanson, Afton, Wis.

[73] Assignee: Western Atlas Inc., Waynesboro, Pa.

[21] Appl. No.: 388,885

[22] Filed: Feb. 14, 1995

Related U.S. Application Data

[63] Continuation of Ser. No. 99,415, Jul. 30, 1993, abandoned.

[51] Int. Cl.$^6$ .................................................. C04B 9/02
[52] U.S. Cl. ..................... 106/685; 106/686; 106/688; 51/307; 51/308; 51/309
[58] Field of Search ....................... 51/308, 309, 307; 106/685, 686, 688, 689, 644

[56] References Cited

U.S. PATENT DOCUMENTS

| | | |
|---|---|---|
| 975,089 | 11/1910 | Wallen ........................... 51/308 |
| 2,712,512 | 7/1955 | Biefield ........................... 106/689 |
| 2,717,841 | 9/1955 | Biefeld et al. . |
| 2,738,285 | 3/1956 | Biefield et al. ........................... 106/689 |
| 3,320,077 | 5/1967 | Prior . |
| 3,499,955 | 3/1970 | Shannon . |
| 3,607,825 | 9/1971 | Shannon . |
| 4,003,752 | 1/1977 | Isohata et al. . |
| 4,084,982 | 4/1978 | Prior et al. . |
| 4,233,368 | 11/1980 | Baehr et al. . |
| 4,444,594 | 4/1984 | Paddison et al. . |
| 4,867,761 | 9/1989 | Brandt et al. ........................... 501/95 |
| 5,049,197 | 9/1991 | Brown . |
| 5,167,710 | 12/1992 | Leroux et al. . |

FOREIGN PATENT DOCUMENTS

| | | | |
|---|---|---|---|
| 8172250 | 10/1983 | Japan ........................... | 106/686 |

*Primary Examiner*—Paul Marcantoni
*Attorney, Agent, or Firm*—Hoffman, Wasson & Gitler

[57] ABSTRACT

Magnesite bonds reinforced with selected fibers have improved resistance to cracking and disintegration in use. Particular embodiments include fiber-reinforced abrasive tools based on magnesite bonds which have improved bond integrity in dry-grinding applications.

34 Claims, No Drawings

5,571,317

FIBER-REINFORCED MAGNESIUM OXYCHLORIDE BOND

This is a continuation of application Ser. No. 08/099,415 filed on Jul. 30, 1993, now abandoned.

BACKGROUND OF THE INVENTION

1. Field of Art

Magnesium oxychloride cement has been used as a bonding agent since early in the twentieth century. While processes for preparing magnesium oxychloride cement bonds are well-known in the art, the chemistry of these processes is not fully understood to this day. The cement is a complex reaction product of calcined magnesium oxide, magnesium chloride, and water, which is admixed in standard proportions and allowed to cure or harden into a cement variously designated in the industry as "magnesite cement", "magnetic cement", "Sorel cement", "French cement", and other terms. "Magnesium oxychloride cement bond" and "magnesite bond" are used interchangeably herein.

Curable magnesium oxychloride cement compositions broadly range from castable mixes to mixes that are quite stiff and are tamped into molds. While the invention herein is applicable to compositions encompassing at least this broad range of formulations, it is particularly applicable to the latter compositions, those that are stiff, and tamped into a mold such as a wheel mold, wherein they are cured to provide the desired shaped product.

Magnesium oxychloride cement has particular application in the production of abrasive tools used for grinding, especially abrasive wheels. The wheels are typically prepared by admixing the bond precursors with abrasive grit and optional additives, molding the mixture into a wheel shape by the above-described tamping operation, and curing the mixture to harden the bond components into a magnesium oxychloride cement bond containing abrasive grit material of a type and amount suitable for the contemplated grinding application.

The product has grinding characteristics eminently suitable for dry grinding applications. Unfortunately, the magnesium oxychloride cement bond is relatively brittle, with a low coefficient of thermal expansion, and the strength of this bond can rapidly deteriorate under the heat generated during dry grinding. The cause of this is not clear; dehydration of the magnesite bond at elevated temperatures may be at least partially responsible. Whatever the etiology of this phenomenon, cracking of the bonding cement during grinding may occur, particularly after prolonged constant use. Such cracking is often followed by premature disintegration of the wheel.

2. Discussion of Related Art

Traditionally, liquid coolants, often fortified with lubricant material, are employed to dissipate heat engendered in various other grinding processes to protect both the abrasive tool and brittle or otherwise susceptible substrates from heat damage. Wet grinding applications employing liquid coolants are not, however, suitable for use in conjunction with magnesium oxychloride cement-bonded abrasive tools. Liquid coolants used to dissipate heat build-up during grinding with abrasive tools not based upon magnesite cement nearly always contain water. Since water softens and dissolves the magnesium oxychloride bond and causes rapid deterioration of the tool, these coolants cannot be used in conjunction with magnesite cement-bonded abrasive tools. Further, certain industrially-important substrates, notably the above-mentioned coil springs, do not lend themselves to wet grinding processes, and so such substrates are commonly dry-ground. As a result, magnesium oxychloride cement-bonded abrasive wheels or other abrasive tools are used almost exclusively for dry grinding applications, particularly for dry-grinding of water-sensitive substrate material such as coil springs, and the tools are at risk of developing deep cracks under the heat generated during grinding, followed by disintegration of the tool.

The incorporation of a wide variety of materials into cementitious compositions to reinforce the cured bond is known. However, few of these materials have proved useful in magnesium oxychloride cement bonds, for good reason.

It has been known for the decades that magnesium oxychloride cement has been in use as a bonding agent for abrasives in grinding applications that the material is highly sensitive to the incorporation of extraneous materials, which in additive-effective amounts typically have been found to weaken bonding of the cement precursors to the point of providing a commercially useless product. As noted above, the chemistry of the magnesium oxychloride cement bonding mechanism is not clearly understood, and addition of extraneous materials to the basic combination of calcined magnesium oxide, magnesium chloride, and water with a view toward improving the formulation has of necessity proceeded on an ad hoc basis. Many reinforcing materials have been suggested for strengthening hydraulic cement bonds other than magnesite bonds such as those based on Portland cement, as well as vitrified bonds and resinous bonds such as phenol formaldehyde-based resins to promote structural strength of the product. However, in combination with the present magnesium oxychloride cement precursors, such additives have typically proved to be deleterious to the cured bond, often weakening the bond structure of the product to the point of uselessness for the intended- application. Bonds exposed to unusual stress in use, most especially abrasive tools for dry-grinding applications, are particularly sensitive to added materials. Thus, the use of materials and processes known in the prior art for reinforcing magnesite bonds has been generally limited to bonds subjected to little or no stress. Construction materials based on reinforced magnesite cements as described in U.S. Pat. Nos. 3,320,077 to Prior et al.; 3,607,825 to Shannon; 4,033,752 to Isohata et al.; and 5,049,197 to Leroux et al. and are exemplary.

Theoretically useful reinforcing materials for obviating cracking and disintegration of magnesite cement bonded abrasive tools such as wheels have often proved disadvantageous in practice. One proposed reinforcing material for magnesite bonds is wire mesh, which has been incorporated into the bond to bridge across the matrix and resist cracking of the product under stress. However, if the product is to be used in abrasive applications, for example an abrasive wheel, the wire mesh cannot be present on a grinding surface of the wheel as wire of sufficient gauge to function as an effective reinforcement will interfere with the grinding process. Since the large majority of the wheel is consumed in grinding, the effectiveness of the wire mesh as a reinforcing agent in abrasive tools is limited. Other known reinforcing materials have proved to seriously compromise the heat strength of magnesite bonds, leading to cracking and disintegration of the bond when exposed to heat, such as in dry grinding applications.

SUMMARY OF THE DISCLOSURE

The invention accordingly comprises an improved magnesite cement bond including a fibrous component characterized as described below in an amount sufficient to reinforce the bond against stress forces. In particular, the invention comprises an abrasive composition including magnesium oxychloride cement precursors, abrasive grit, and the fibrous component, curable to provide a magnesite-bonded abrasive tool, especially an abrasive wheel, resistant to cracking and/or disintegration in use, particularly under heat exposure in dry-grinding applications. The selected fibers provide reinforcement throughout the entire matrix of the bond, increasing the life and safety of the product by bridging minor fractures in the bond and resisting the development of these fractures into deep cracks which might compromise the integrity of the bond. The reinforcing fibers according to the invention do not significantly weaken the magnesite bond chemistry, do not affect grinding efficiency, are dispersable substantially evenly throughout the matrix of the bond to ensure uniform strength of the product, and in a particular embodiment, are combined with an adhesive to promote adherence of the fibers within the matrix of the bond under stress. The product is an exceptionally useful dry-grinding tool, especially an abrasive wheel.

DETAILED DESCRIPTION OF THE INVENTION

According to the invention, a fibrous component is added to a conventional magnesium oxychloride cementitious bonding composition essentially comprising calcined magnesium oxide, magnesium chloride, and water to form a plastic, settable composition suitable for the intended use. Formulations for such settable magnesium oxychloride cementitious compositions are well-known in the art; the present invention is directed to the structural improvement in the hardened final products afforded by the presence of the fibrous component. While abrasive tools comprising fiber-loaded magnesium oxychloride cement bonds containing abrasive grits are particularly contemplated, especially for the resistance of the product to the development of significant cracks due to the heat generated in dry-grinding applications, the strengthening qualities of the fibers in combination with conventional magnesium oxychloride cement bonds is also useful in applications other than grinding applications.

Fibers suitable for incorporation with the magnesium oxychloride cement precursors (i.e., the plastic, settable magnesium oxide/magnesium chloride/water admixture, herein also referred to as the "magnesite cementitious composition") broadly comprise fibers of a length and number to provide substantial bonding of the fibers within the bond matrix on both sides of any early hairline fractures in the bond so that widening of the cracks is substantially prevented. The exact length of the fibers will vary according to the degree of reinforcement deemed necessary to maintain the integrity of the bond in a given application; however, for adequate reinforcement of heavy magnesite-bonded abrasive tools such as abrasive wheels, a minimum average length of about ⅛" is deemed to be critical; the maximum length is not critical, however, fibers between about 1/16" and about 2" in average length are recommended for most applications. The amount of the fibers is similarly variable, but again, for the abrasive wheels of the invention, fibers in the amount of from about 0.2% to about 10% by volume, preferably about 0.2% to about 5%, and most preferably about 0.5% to 3%, of the curable cementitious magnesite composition is highly preferable for most applications.

Fibers useful in the practice of the invention comprise those fibers having a breaking strength which can withstand the forces applied by a cracking matrix in order to intercept further development of the crack(s). Substantially non-stretchable fibers are preferred. Metal fibers, synthetic resin fibers, ceramic fibers and glass fibers are contemplated: stainless steel, carbon steel, brass, bronze, copper, aluminum, carbon; polyesters, polyamides such as the various nylons, polyaramides, polyolefins such as polypropylenes, or copolymers thereof; or fiberglass, are all useful, providing that their physical properties conform to the above-described parameters, and that the amount of the fibers required for sufficient reinforcement of the matrix, or the properties thereof, do not substantially adversely affect the chemistry of the magnesite bond. Fiber diameter necessary to fulfill the breaking strength requirement will depend upon the particular fiber selected; however, an exemplary material comprises fiberglasshaving an average length of from about ⅛" to about 2" in length, preferably about ¼" to ¾", and a diameter of from about 5 to 50 microns. Fiber diameter in an abrasive composition should not be large enough to impact upon the grinding process contemplated; in general, the diameter of non-metal fibers such as fiberglass can be of broader range, as these fibers are readily consumed in the grinding process without affecting the workpiece surface.

It is essential to the invention that the chosen fibers be readily dispersible in the cementitious composition to ensure substantially uniform dispersion of the fibers throughout the bond matrix. Single strand fibers, particularly single strand fiberglass fibers are unsuitable for the present invention, as when admixed with the magnesite cement precursors, the strands "bird nest", creating islands of fibers in the cured matrix, rather than the substantially uniform distribution of fibers requisite for achieving the desired results of the invention. Surprisingly, it has been found that introducing the fibers as bundles thereof, rather than as single strands, into the characteristically viscous and heavy magnesite cement mix results in efficient dispersal of the fibers within the mix to provide the desired uniformity. Accordingly, fiber bundles, especially bundles that separate during mixing to provide both individual and bundled reinforcing units, are employed in the practice of the invention; fiberglass bundles are particularly suitable. Exemplary fiber bundles comprise chopped fiberglass bundled strands available from PPG, Pittsburgh, Pa., USA.

In a particularly advantageous embodiment of the invention, the fiber bundles are precoated with an adhesive capable of bonding the fibers to the magnesite matrix. The adhesive is selected according to the fiber characteristics, and the bond characteristics, including the characteristics of the abrasive grit or other filler(s) present, to promote secure embedment of the fibers within the bond and to enhance resistance of the fibers to being dislodged from the matrix of the bond. Epoxy resin adhesive has proven particularly effective for adhering glass fibers to abrasive-loaded (e.g., aluminum oxide and\or silicon carbide abrasive grit) magnesite bond; an exemplary useful epoxy adhesive Epi-Rez WD-510, is available from Rhone-Poulanc, Louisville, Ky., USA. In general, the adhesive is incorporated into the composition in adhesive-sufficient amounts, suitably by admixing the fibers with the adhesive prior to incorporating the fibers into the magnesite cementitious composition; recommended proportions of fiber to adhesive are from about 5% to about 180% by wt adhesive, based on the weight of the fiber; the range will vary, depending, inter alia, upon the selected fiber and adhesive. For glass fibers, an amount of epoxy adhesive (resin plus hardener in conventional proportions) of from about 30% to about 100% more typically from about 60% to 80% by weight of adhesive based on the weight of fibers is exemplary. Preferably, the adhesive is water-miscible to facilitate a homogenous mix.

The magnesite cementitious composition is readily prepared from commercially available materials as known in the art. Magnesium oxide powder is typically combined with an aqueous solution of magnesium chloride in proportions which give the desired consistency to the mix and the desired product. Exemplary useful ingredients include substantially pure calcined magnesium oxide powder admixed with an aqueous solution of magnesium chloride of, for example, from about 15 to about 30 wt % magnesium chloride, in amounts of about equal parts by weight of the solution and powder up to an excess of the magnesium chloride solution of about 10 to 15% by weight of the calcined MgO. This admixture is supplemented with water as necessary to improve the consistency of the cementitious mix. Particularly useful sources of magnesium chloride for the magnesite cementitious compositions of the invention are solutions marketed by Dow Chemical, Midland, Mich. USA such as L-30 (aqueous magnesium chloride, 30° Baumé).

Other components can be added to the mix as desired, insofar as such additives do not substantially weaken the magnesite bond. Any such additives are generally selected according to the intended use of the product. For example, in applications requiring substantial flexural strength, such as large abrasive grinding tools, various clays such as aluminum-silicate clays, especially kaolin clays, are frequently added as strengthening agents. For abrasive tool applications, suitable abrasive grits such as silicon carbide, aluminum oxide, sol-gel aluminum oxide, or glass frit are incorporated as customary in the art. Pigments, as another example, may also be included wherein visual qualities are of importance. Additives such as fillers and grain spacers are further exemplary, with the proviso that any such additives do not substantially compromise the integrity of the magnesite bond. In certain tool applications, such as abrasive wheels, the mold may be prepared with inserted nuts, cups, dowel caps, wire mesh or other elements known in the art.

For general use, the fiber component (optionally adhesive-coated) is conveniently admixed with the dry ingredient(s), and the remaining liquid cement precursors incorporated according to methods recognized in the art. Typically, any dry additives such as clay, abrasive, or pigment powders are additionally first admixed with the magnesium oxide powder and fibers, followed by gradual incorporation of the liquid ingredients (including magnesium chloride if added as aqueous solution) with mixing to form a homogeneous (non-lumpy) mass. The mixture is then shaped and cured in customary fashion. If adhesive-coated fiber is incorporated as described above, curing conditions are adjusted as necessary to cure the adhesive as well as the magnesite bond precursors.

In a particular embodiment of the application, fiber is incorporated into a magnesium oxychloride cementitious material formulated for the preparation of an abrasive tool, especially an abrasive wheel. In an exemplary preparation, for any given conventional abrasive tool formulation, fiber as described above, especially glass fiber from about 1/16" to 1.5", particularly about 1/8" to 1", and especially about 1/2", in average length in bundles is coated with a conventional water-miscible epoxy resin adhesive system comprising epoxy resin and hardener. Calcined magnesium oxide, abrasive grit such as fused aluminum oxide or silicon carbide in an amount sufficient for the intended application, and any other dry ingredients are then combined with the adhesive-coated fibers. Magnesium oxychloride solution is then added to the dry mix with further thorough mixing; water or additional magnesium oxychloride solution may be added to the resulting cementitious composition to adjust the consistency thereof in customary fashion. Alternately, a conventional magnesite cementitious composition is admixed, followed by addition of the epoxy-coated fibers with further mixing to provide a homogenous mass.

The product composition is then placed, for example, into a wheel mold, and compacted by a usual method. The mold may be prepared prior to use by, for example, insertion of nuts as known in the trade for a nut-inserted abrasive disc product. Other preparations of the molds, including those described supra, may be employed. The molded product is cured under controlled conditions to transform the bond precursors into a magnesium oxychloride bond and to cure the epoxy adhesive precursors, for example, for about 10 to 75 days, usually from about 10 to 60 days, at a temperature of from about 90° to 110° F.

If desired, the magnesite bond may include other reinforcing agents in addition to the described fibers, such as wire mesh preset into the mold before pouring of the uncured material.

The following Examples are illustrative of the invention.

EXAMPLE I

Materials

White or brown aluminum oxide abrasive grit.

Water miscible epoxy adhesive system (Epi-Rex WD 510, Rhone-Poulenc, Louisville, Ky., USA).

Calcined magnesium oxide powder.

Magnesium chloride (29% aqueous solution 30° Baumé, Dow Chemical, Midland Mich., USA).

Fillers (Kaolin clay, Georgia Clay Co., Ga., USA).

Glass fibers (Certain Teed Fiberglass Reinforcements, Wichita Falls, Tex., USA; CT 919-A4, ½" length.

A composition was prepared of the above materials as follows:

| Ingredient | Amount (oz.) |
| --- | --- |
| $Al_2O_3$ | 283.18 |
| Epoxy resin | 3.35 |
| Epoxy resin hardener | 1.12 |
| MgO and Kaolin Clay | 46.84 |
| (100 parts MgO to 25 parts clay) | |
| $MgCl_2$ aqueous solution | 42.87 |
| Glass fibers (⅛" to 1 ¾") | 6.38 |

The glass fiber bundles (constituting 2% by volume of the above composition) were mixed in a first mix bowl with the epoxy adhesive components for 1 minute. In a second mix bowl, the abrasive grit, magnesium oxide, filler, and magnesium chloride solution and water were mixed for 3 minutes. The contents of the first mix bowl were added to the second mix bowl and the combined ingredients mixed for an additional 3 minutes to homogenize the mix. A portion of the resulting final mix was evenly distributed in a conventional 36" steel wheel mold provided with mounting nuts, compacted, and cured at 100° F. for 30 days to obtain a nut-inserted abrasive disc.

EXAMPLE II (COMPARISON EXAMPLE)

A control wheel was prepared as described in Example I, except that the epoxy adhesive system and glass fibers were omitted, and the remaining ingredients were mixed for a total of 3 minutes to homogenize.

A. Both wheels were heated in excess of 350° F. on the grinding faces in a radiant heat oven. Heat cracks appeared in the unreinforced wheel after approximately ½ hour due to internal stresses caused by expansion and evolution of volatiles. The fiber reinforced wheel of Example I showed no heat cracking under the same conditions.

B. The fiber-reinforced wheel was then allowed to cool and was deliberately cracked in a hydraulic press along intersecting directions. The wheel was mounted in a testing machine which rotated the wheel at high speed to simulate centrifugal forces encountered during grinding operation. The wheel was mounted by bolting the wheel to a steel plate using the mounting nuts in the wheel back. The wheel was then accelerated to 1.5 times its normal operating speed, equivalent to 8250 surface feet per minute or 875 rpm on a 36" diameter. Under these conditions, 2.25 times the centrifugal stress exerted at normal operating speeds was placed on the wheel. No visible damage was observed, and the wheel remained intact. The cracks did not enlarge.

C. A pie-shaped cracked piece of the stressed wheel from B, above, approximately 1 foot square was then targeted for testing. The piece was located on the outer diameter of the wheel where it was not constrained by the rest of the wheel. All mounting bolts were then removed from the test piece, and the wheel was again accelerated to 875 rpm. Despite the centrifugal stress placed on the test piece, the test piece did not detach from the body of the wheel, but remained in its original position. It was concluded that the fibers held the pie-shaped cracked piece in place, without assistance of mounting nuts.

EXAMPLE III (Effect of Fibers on Magnesite Bond Strength)

Bars were made using the control composition and various fiber reinforced compositions (Table). After curing, all were broken in a universal strength tester in a 3 point transverse mode. The flexural strength (primary) of all the non-reinforced bars was recorded, leaving all the non-reinforced bars in pieces. The maximum flexural strength of the reinforced bars was also recorded ("primary"); however, all the reinforced bars remained in one piece. The test on the reinforced bars was continued by allowing the head of the universal tester to continue downward onto the bars until ultimate failure of the fibers occurs. This second flexural strength ("secondary") is recorded as the strength of the fiber reinforcement surviving the matrix cracking as shown in Table 1:

TABLE 1

| Fiberglass* Content (% of Wt. Vol) | Epoxy** Content | Flexural Strength | | % Strength Retained |
|---|---|---|---|---|
| | | Primary | Secondary | |
| control | 0 | 3236 psi | 0 psi | 0% |
| 1.0 | 50 | 3212 | 1079 | 33.6 |
| 2.0 | 50 | 3186 | 2099 | 65.6 |
| 0.5 | 60 | 3181 | 306 | 9.6 |
| 1.0 | 60 | 3233 | 1217 | 37.6 |
| 1.5 | 60 | 3372 | 2108 | 62.5 |
| 2.0 | 60 | 3368 | 1689 | 50.1 |
| 1.0 | 70 | 3168 | 1235 | 39.0 |
| 2.0 | 70 | 3478 | 2237 | 64.3 |

*Fiber content as a percent of the wheel volume.
**Epoxy and hardener content as a percent of fiber weight.

In all cases, the fiber-reinforced bars show a significant secondary strength not present in the control bars. Also, all fiber-reinforced bars show a primary strength that is very close to or superior to the control. The optimum case shown is from example 1 above, which contains 2% fiberglass by volume and 70% of the fiberglass weight as epoxy and hardener. In this case, the bars are 7% stronger than the control initially and retain 64.3% of their strength after the matrix is cracked. By comparison, the control bars had no strength after the matrix cracked and they fell into pieces.

Although the preferred embodiment has been described in considerable detail through the above examples, these are presented for illustration only. Variations and modifications can be made by one skilled in the art while keeping within the spirit and scope of this invention.

What is claimed is:

1. An abrasive tool comprising an abrasive magnesium oxychloride cement bond containing ceramic fibers having a minimum average length of at least about ¼" in an amount sufficient to reinforce the bond against disintegration in use, and abrasive grit in an amount sufficient to render the bond abrasive to a workpiece.

2. The abrasive tool of claim 1, wherein the fibers have a maximum average length of about 2".

3. The abrasive tool of claim 2, wherein the fibers are glass fibers.

4. The abrasive tool of claim 1, comprising an abrasive wheel.

5. The abrasive wheel of claim 4, comprising a nut-inserted abrasive disc.

6. The abrasive tool of claim 1, wherein the bond is prepared from a curable cementitious composition comprising magnesium oxide, magnesium chloride, water, fibers, and abrasive grit, and the fibers are present in the composition in an amount of from about 0.2% to about 10% by volume.

7. The abrasive tool of claim 6, containing fibers in an amount of at least about 0.5% by volume.

8. The abrasive tool of claim 7, wherein the fibers are present in the composition in an amount of from about 0.5% to about 3% by volume.

9. The abrasive tool of claim 8, wherein the fibers are glass fibers.

10. The abrasive tool of claim 9, which is an abrasive wheel.

11. The abrasive tool of claim 1, wherein the fibers are adhered to the bond with an adhesive.

12. The abrasive tool of claim 11, wherein the adhesive is a water-miscible epoxy adhesive.

13. The abrasive tool of claim 12, wherein the fibers are glass fibers.

14. The abrasive tool of claim 11, wherein the bond is prepared from a curable cementitious composition comprising magnesium oxide, magnesium chloride, water, adhesive-coated fibers and abrasive grit, and the fibers are present in the composition in an amount of from about 0.5% to about 3% by volume of the composition.

15. The abrasive tool of claim 14, wherein the fibers are glass fibers.

16. The abrasive tool of claim 14, wherein the fibers are incorporated into the cementitious composition in the form of fiber bundles coated with adhesive.

17. The abrasive tool of claim 16, wherein the adhesive is a water-miscible epoxy adhesive.

18. The abrasive tool of claim 17, wherein the fibers are glass fibers.

19. The abrasive tool of claim 17, wherein the abrasive tool is an abrasive wheel.

20. The abrasive tool of claim 14, wherein the adhesive is present in the composition in an amount of from about 60% to 80% by weight of the fibers.

21. The abrasive tool of claim 20, wherein the fibers are glass fibers.

22. The abrasive tool of claim 21, wherein the fibers are incorporated into the cementitious composition in the form of fiber bundles coated with adhesive.

23. The abrasive tool of claim 14, wherein the fibers are coated with adhesive in an amount of at least about 50% by weight of the fibers.

24. A magnesium oxychloride cement bond grinding wheel prepared from a curable cementitious magnesite composition including abrasive grit and ceramic fibers having a minimum average length of about ¼" and comprising at least about 0.5% by volume of the composition.

25. The grinding wheel of claim 24, wherein the fibers have a minimum average length of about ½".

26. The grinding wheel of claim 24, wherein the fibers are adhered to the bond with an adhesive.

27. The grinding wheel of claim 26, wherein the adhesive is an water-miscible epoxy adhesive.

28. The grinding wheel of claim 27, wherein the fibers are incorporated into the cementitious composition in the form of fiber bundles coated with the adhesive.

29. The grinding wheel of claim 28, wherein the adhesive is present in an amount of from about 60 to 80% by weight of the fibers.

30. The grinding wheel of claim 29, comprising a nut-inserted abrasive disc.

31. The grinding wheel of claim 24, wherein the fibers are coated with adhesive in an amount of at least about 50% by weight of the fibers.

32. The grinding wheel of claim 24, containing at least about 1.0% by volume fibers.

33. The grinding wheel of claim 32, containing up to about 3% by volume fibers.

34. The abrasive tool of claim 11, wherein the fibers are incorporated into the cementitious composition in the form of bundles.

* * * * *